United States Patent Office 2,923,822
Patented Feb. 2, 1960

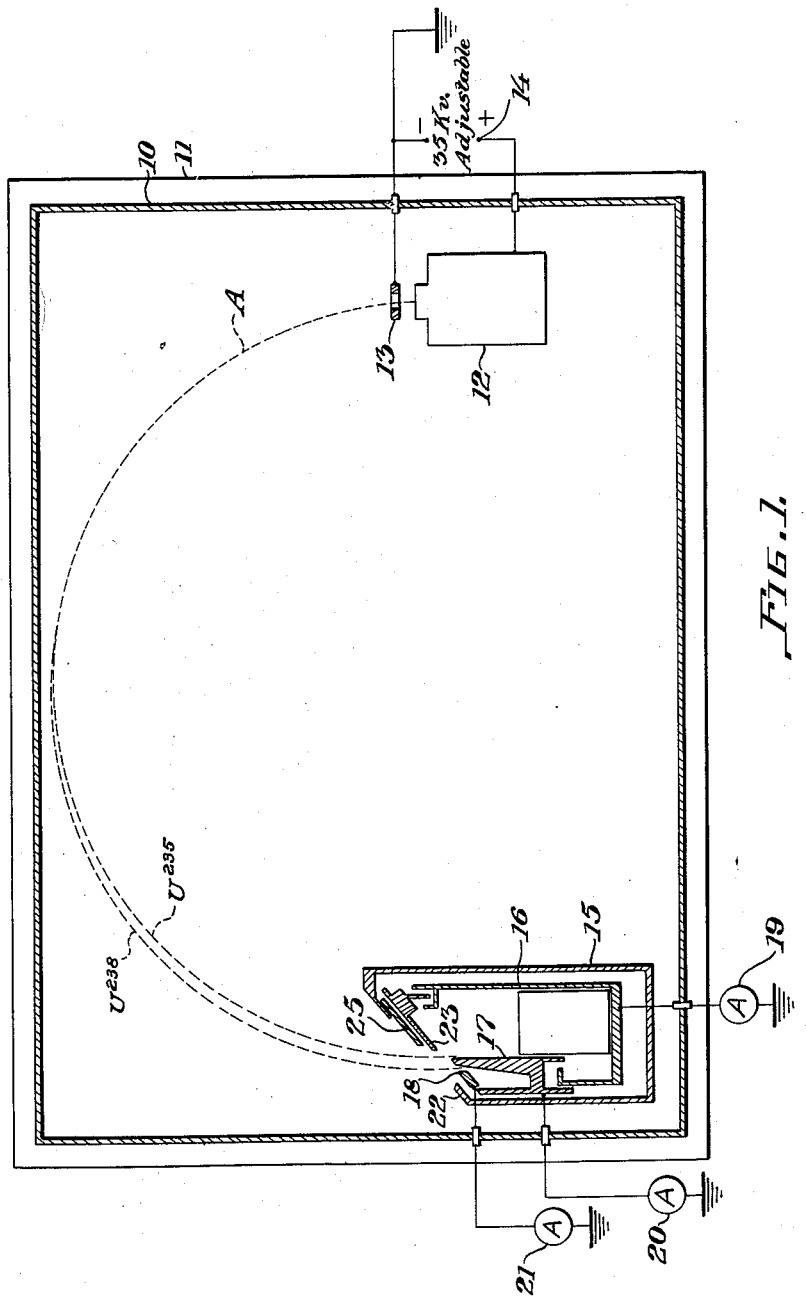

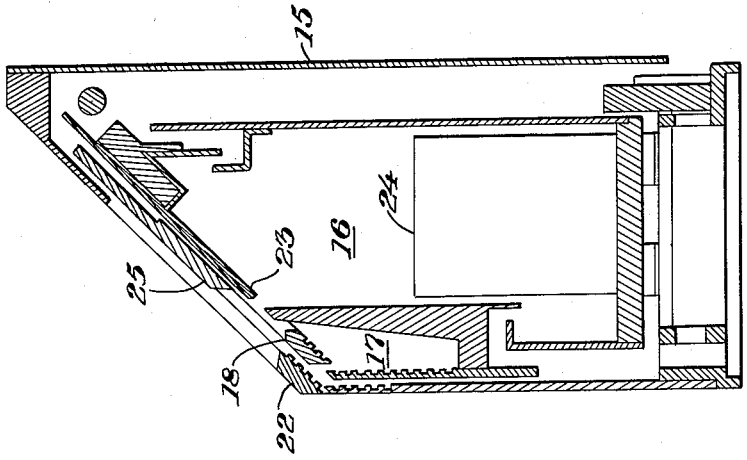
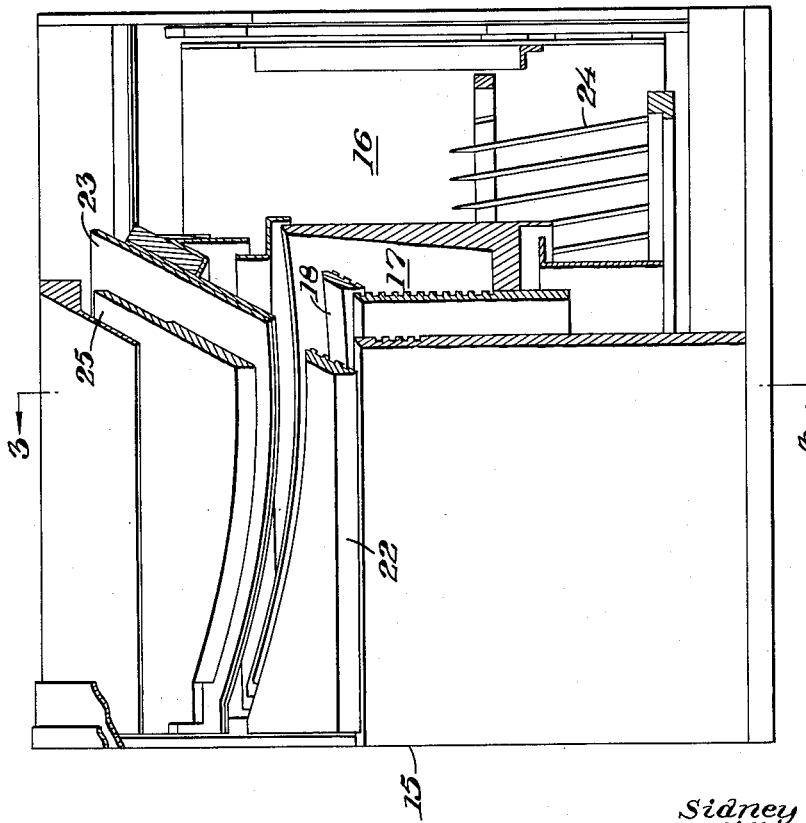

2,923,822

ELECTROMAGNETIC SEPARATION OF ISOTOPES

Sidney W. Barnes, Rochester, N.Y., and Clifford M. Cantrell, Bainbridge, Ga., assignors, by mesne assignments, to the United States of America as represented by the United States Atomic Energy Commission Application July 7, 1948, Serial No. 37,396

5 Claims. (Cl. 250—41.9)

The present invention relates generally to isotope separating apparatus of the electromagnetic type commonly referred to as a calutron, and more particularly to receiver units for separately collecting the different isotopes after they have been separated into distinct ion beams in such apparatus.

While the apparatus of the present invention is not limited to the separation of the isotopes of any one element, in order for its principles to be clearly understood, the invention will be described as embodied in apparatus adapted for the separation of the uranium isotopes having atomic weights 235 and 238, the isotope having an atomic weight of 234 being ignored.

In such calutrons, a beam of positive ions of uranium is formed and projected at a high uniform velocity into an evacuated region traversed by a substantially uniform magnetic field at right angles to the direction of motion of the ions. As a result, each particular ion is caused to describe a circular path having a radius proportional to the square root of its mass. In this way the original single ion beam is split into two more or less distinct component beams, one of which consists primarily of uranium ions having a mass of 238 and the other of which consists primaily of uranium ions having a mass of 235. Because of a geometrical focusing action, these two beams are most distinctly resolved after the completion of 180° of their circular path, and the $U^{235}$ and $U^{238}$ ions may be separately collected at a receiver located at this point.

In the present state of the art, it is not possible on a large scale to obtain perfect separation in a single operation, and, in addition, there is always a considerable amount of the feed material vapor which is not ionized and which condenses on various internal parts within the calutron. This condensed material, along with that not collected in the receivers, is salvaged and added to other feed material for recycling. In order for best results to be obtained, it is desirable to have the feed material uniform with respect to isotope concentration whether or not this concentration is natural or enriched in one isotope. In other words, it is desirable to have the salvaged material contain the same proportion of each isotope as the feed material with which it is mixed.

It has been common practice to collect the "desired" isotope without too much regard for what happened to the other isotope, which practice resulted in an impoverishment of the recycled material by reason of the fact that the salvaged material contained a greater proportion of the "undesired" isotope.

An object of the invention is the provision in electromagnetic isotope separating apparatus of receiver means for retaining substantially all of the ionized material reaching the receiver, that is substantially all of both isotope beams, thereby avoiding impoverishment of the material to be recycled.

Another object of the invention is the provision in such apparatus of receiver means for separately collecting both isotopes with the same efficiency, whereby the uncollected material contains both isotopes in the same relative proportions as does the feed material.

Other objects and advantages of the invention will be evident from the following description when read in connection with the accompanying drawing in which:

Fig. 1 is a partly diagrammatic view in section showing isotope separating apparatus incorporating the receiver of the invention;

Fig. 2 is a fragmentary front elevation of a receiver embodying the invention; and Fig. 3 is a section taken along the line 3—3 of the receiver shown in Fig. 2.

In Fig. 1, an electromagnetic isotope separating apparatus is shown diagrammatically as comprising a closed vessel 10 positioned in a strong substantially uniform transverse magnetic field provided by a magnet, one pole piece 11 of which is shown. The vessel 10 provides a space within which electromagnetic separation of ions may take place, and is preferably highly evacuated, although the presence of a small amount of gas is desirable under some circumstances to avoid so-called "space charge" effects.

Within the closed vessel 10 and also within the region of influence of the magnetic field produced by the pole piece 11, there is provided a source 12 of positive ions of a material the isotopes of which it is desired to separate. A slotted accelerating electrode 13 projects the ions emitted by source 12 in a direction normal to the magnetic field and in the form of a discrete stream or beam A of high velocity ions. The accelerating electrode 13 is made negative with respect to the ion source 12 from any suitable direct current supply 14 which preferably is adjustable. A suitable source 12 is shown and described in more detail in U.S. patent appl. Ser. No. 561,271 entitled Temperature Control and filed October 31, 1944, in the name of Emmett V. Martin, now Patent No. 2,712,073, issued June 28,1955.

As is known, the ion beam A projected through the slot in the accelerating electrode 13 will, as indicated, follow a substantially circular orbit, and after 180° of travel, the different isotopes will attain maximum separation. It is at this point that a receiver unit 15 is positioned with its entrance slots coinciding as nearly as possible with the best foci of the two isotopes.

Although the individual isotope beams are represented in Fig. 1 as being discrete and of substantially zero width, it will be understood that in order to obtain large scale collection, the original beam A is not projected from the ion source 12 in only a single direction, but rather is permitted to fan out in all directions lying within a small angle, as fully explained on page 191 of Atomic Energy for Military Purposes by H. D. Smyth, Princeton University Press, Princeton, 1945. Thus, each isotope beam may be considered, in turn, as made up of a multitude of individual beams each having a characteristic angle of emergence from the source and a corresponding characteristic angle of entrance into the receiver. The central or middle one of these beams is referred to as the "zero degree" beam.

As will be described in connection with Figs. 2 and 3, the receiver 15 has two separate pockets 16 and 17 and an auxiliary electrode 18, all of which are electrically isolated and connected through meters 19, 20, and 21, respectively, so that the magnitude of their respective deionizing currents may be known for control and other purposes. The entrance slots to the reeciver 15 are defined by face plates 22 and 23. As shown in Fig. 2, the original ion beam splits up into more or less discrete individual beams which beams are each composed primarily of only one isotope. Thus, if natural uranium is employed as the feed material, a $U^{235}$ beam and a $U^{238}$ beam are formed, as shown, the $U^{235}$ beam being collected in reeciver pocket 16.

Referring now to Figs. 2 and 3, a receiver unit 15 is designed in accordance with the principles of the present invention so that it will reject ions in the $U^{235}$ and $U^{238}$ beams in substantially the same ratio, or, stated conversely, the pockets 16 and 17 retain substantially equal percentages of the ionized material entering the pockets. This desideratum is obtained by making the pockets 16 and 17 relatively deep, and by disposing the entire back wall of pocket 17, that is, the wall which separates the two pockets, at a zero angle with respect to the zero degree entering ion beam. As shown in the drawings, the back wall of pocket 17 may be tapered a slight amount, if desired, in which case the wall as a whole is disposed such that its central plane is parallel to the incoming zero degree ion beam. This back wall of pocket 17 constitutes the dividing line between $U^{235}$ and $U^{238}$ beams entering between the face plates 22 and 23. Pockets 16 and 17 are suitably insulated in any well known manner and are separately metered (see Fig. 1) by meters 19 and 20 for general process information. Due to the fact that a considerable fraction of the $U^{235}$ beam hits the back wall of pocket 17 and is electrically recorded as $U^{238}$ by the meter 20, these readings of the meters 19 and 20 are not electrically correct with respect to the actual reception of ions. For this reason the auxiliary electrode 18 may be located as shown, to provide a current reading on the meter 21 useful in regulating the apparatus. As is known, the electrode 18 through its meter 21 provides information relative to the intensity and, what is more important, the position of the $U^{238}$ beam. The method of employing electrode 18 and meter 21 for monitoring purposes is more fully disclosed in U.S. patent appl. Ser. No. 690,808, entitled Control for Isotope Separating Apparatus, filed August 15, 1946, in the name of H. W. Brackney.

The receiver of the present invention as shown in the drawings incorporates many well known features of construction which have been found to be desirable. Such features include "footscraper" blades 24 set at an angle in the bottom of the $U^{235}$ pocket to improve retention, a door or shield 25 which may be moved to a position where it prevents material from entering the $U^{235}$ pocket during start up and preliminary adjustment of the apparatus, corrugated or "waffled" surfaces where it is desired to prevent peeling or flaking off of received material, and the like. Many parts are made of carbon to increase the life of the receiver and to facilitate recovery of the received material.

No specification of parts or assembly details have been given since they are in general subject to the choice of the designer. However, the receiver has been sufficiently described to enable one skilled in the art to construct without difficulty a receiver incorporating the present invention.

It is to be understood that receivers having pockets adapted to retain the same percentage of entering ions may take other forms than the one illustrated and described to explain the invention. All obvious modifications are intended to be included within the scope of the appended claims.

While the invention has been largely illustrated in connection with the separation of uranium isotopes, it will be understood that the invention may be employed in the identical form illustrated and with equally advantageous results, for general isotope separation, whether the isotopes separated are fissionable or not. For example, the isotopes 63 and 65 of copper, or the isotopes of any other element, may be equally well separated by the foregoing arrangements. Whatever the mass of the ions entering the respective receiver pockets, the pockets of a receiver designed in accordance with the principles of the present invention will retain substantially equal percentages of the entering ions.

We claim:

1. In isotope separating apparatus in which the mass spectrum of two isotopes is electromagnetically established as closely adjacent regions of approximate focus, a receiver unit having face plates defining an entrance slot substantially coinciding with said regions of focus, a pocket positioned within the receiver unit to receive and retain the lighter of the two isotopes passing through the entrance slot, a second pocket positioned within the receiver unit to receive and retain the heavier of the two isotopes passing through the entrance slot, said second pocket having a rear wall defining the dividing line between the respective pockets, said wall having faces extending substantially parallel to the direction of motion of the zero degree incoming ion beam.

2. In apparatus for the electromagnetic separation of two isotopes of an element, means for establishing the mass spectrum of the two isotopes as closely adjacent beams of ions, receiver means having two entrance slots leading to two electrically isolated pockets, a wall of the pocket intended to receive the heavier ions defining one side of the entrance slot to the other pocket and being so constructed and arranged that the two sides of the wall are substantially equally exposed to the respective ion beams, whereby the percent rejection of material entering the two entrance slots is the same for each slot.

3. In isotope separating apparatus in which the mass spectrum of two isotopes is electromagnetically established as closely adjacent regions of approximate focus, a receiver unit having face plates defining an entrance slot substantially coinciding with said regions of focus, a pocket positioned within the receiver unit to receive and retain the lighter of the two isotopes passing through the entrance slot, a second pocket positioned within the receiver unit to receive and retain the heavier of the two isotopes passing through the entrance slot, said second pocket having a rear wall defining the dividing line between the respective pockets, the opposite faces of said wall making substantially equal but opposite angles with respect to the incoming zero degree ion beam.

4. In isotope separating apparatus in which the mass spectrum of two isotopes is electromagnetically established as closely adjacent regions of approximate focus, a receiver unit having face plates defining an entrance slot substantially coinciding with said regions of focus, a pocket positioned within the receiver unit to receive and retain one of the two isotopes passing through the entrance slot, a second pocket positioned within the receiver unit to receive and retain the other of the two isotopes passing through the entrance slot, said second pocket having a rear wall defining the dividing line between the respective pockets, said wall having faces extending substantially parallel to the direction of motion of the zero degree incoming ion beam.

5. In isotope separating apparatus in which the mass spectrum of two isotopes is electromagnetically established as closely adjacent regions of approximate focus, a receiver uint having face plates defining an entrance slot substantially coinciding with said regions of focus, a pocket positioned within the receiver unit to receive and retain one of the two isotopes passing through the entrance slot, a second pocket positioned within the receiver unit to receive and retain the other of the two isotopes passing through the entrance slot, said second pocket having a rear wall defining the dividing line between the respective pockets, the opposite faces of said wall making substantially equal but opposite angles with respect to the incoming zero degree ion beam.

References Cited in the file of this patent

UNITED STATES PATENTS

| | | |
|---|---|---|
| 2,725,481 | Barnes | Nov. 29, 1955 |
| 2,794,923 | Barnes | June 4, 1957 |
| 2,852,687 | Kudravetz et al. | Sept. 16, 1958 |

OTHER REFERENCES

Oliphant et al.: Proceedings Royal Society of London, vol. 146A, 1935, pp. 922–929.